US005479002A

United States Patent [19]
Heiman et al.

[11] Patent Number: 5,479,002
[45] Date of Patent: Dec. 26, 1995

[54] BAR CODE SCANNER WITH SCANNING BEAM AND/OR FIELD OF VIEW ADJUSTABLE ABOUT THREE MUTUALLY ORTHOGONAL AXES

[75] Inventors: Frederic Heiman, Los Gatos, Calif.; Joseph Katz; Boris Metlitsky, both of Stony Brook, N.Y.; Mark Krichever, Hauppauge, N.Y.

[73] Assignee: Symbol Technologies, Inc., Bohemia, N.Y.

[21] Appl. No.: 366,383

[22] Filed: Dec. 29, 1994

Related U.S. Application Data

[63] Continuation of Ser. No. 79,761, Jun. 21, 1993, abandoned, which is a continuation-in-part of Ser. No. 881,280, May 11, 1992, Pat. No. 5,306,900, which is a division of Ser. No. 699,417, May 13, 1991, Pat. No. 5,191,197, which is a continuation-in-part of Ser. No. 193,265, May 11, 1988, Pat. No. 5,144,120.

[51] Int. Cl.[6] .................................................. G06K 7/10
[52] U.S. Cl. .......................... 235/472; 235/462; 235/470
[58] Field of Search ..................................... 235/462, 472, 235/470; 362/421

[56] References Cited

U.S. PATENT DOCUMENTS

| | | | |
|---|---|---|---|
| 1,739,641 | 12/1929 | Lessmann | 362/421 X |
| 2,039,406 | 5/1936 | Greensfelder . | |
| 3,585,366 | 6/1971 | Kern . | |
| 3,729,618 | 4/1973 | Drew et al. . | |
| 3,781,078 | 12/1973 | Wildhaber . | |
| 3,866,056 | 2/1975 | Minniear et al. . | |
| 4,251,798 | 2/1981 | Swartz et al. . | |
| 4,369,361 | 1/1983 | Swartz et al. . | |
| 4,387,297 | 6/1983 | Swartz et al. . | |
| 4,409,470 | 10/1983 | Shepard et al. . | |
| 4,410,235 | 10/1983 | Klement et al. . | |
| 4,436,260 | 3/1984 | Donelan | 244/3.16 |
| 4,496,831 | 1/1985 | Swartz et al. | 235/472 |
| 4,560,862 | 12/1985 | Eastman et al. | 235/472 |
| 4,578,571 | 3/1986 | Williams . | |
| 4,743,773 | 5/1988 | Katana et al. | 235/472 |
| 4,766,297 | 8/1988 | McMillan . | |
| 4,838,632 | 6/1989 | Manian . | |
| 4,930,848 | 6/1990 | Knowles | 235/472 |
| 4,939,356 | 7/1990 | Rando et al. | 235/467 |
| 4,983,818 | 1/1991 | Knowles | 235/472 |
| 4,999,617 | 3/1991 | Uemura et al. . | |
| 5,105,070 | 4/1992 | Wike, Jr. et al. | 235/467 |
| 5,144,120 | 9/1992 | Krichever et al. . | |
| 5,191,197 | 3/1993 | Metlitsky et al. . | |
| 5,208,817 | 4/1993 | Koenck et al. | 361/393 |

FOREIGN PATENT DOCUMENTS

| | | |
|---|---|---|
| 0513530 | 7/1989 | European Pat. Off. . |
| 60-168282 | 8/1985 | Japan . |
| 2-83684 | 3/1990 | Japan ........................ 235/462 |
| 2-144681 | 6/1990 | Japan . |
| 2-231689 | 9/1990 | Japan . |

*Primary Examiner*—John Shepperd
*Assistant Examiner*—Michael G. Lee
*Attorney, Agent, or Firm*—Finnegan, Henderson, Farabow, Garrett & Dunner

[57] ABSTRACT

A scan head is adjustably mounted in a ball-and, socket joint on a scan module or housing of an electro-optical system for reading coded indicia. The scan head is movable about three mutually orthogonal axes intersecting within the scan head, thereby steering a light beam emitted from the head and/or steering a field of view of a sensor.

50 Claims, 2 Drawing Sheets

BAR CODE SCANNER WITH SCANNING BEAM AND/OR FIELD OF VIEW ADJUSTABLE ABOUT THREE MUTUALLY ORTHOGONAL AXES

CROSS-REFERENCE TO RELATED APPLICATIONS

This application is a continuation of application Ser. No. 08/079,761 filed Jun. 21, 1993, now abandoned which application is a continuation-in-part of application Ser. No. 07/881,280, filed May 11, 1992 now U.S. Pat. No 5,306,900 which, in turn, is a divisional of application Ser. No. 07/699,417, filed May 13, 1991, now U.S. Pat. No. 5,191, 197, which is a continuation-in-part of application Ser. No. 07/193,265, filed May 11, 1988, now U.S. Pat. No. 5,144, 120.

BACKGROUND OF THE INVENTION

1. Field of the Invention

This invention generally relates to electro-optical systems for reading indicia of different light reflectivity such as bar code symbols and, more particularly, to adjustably steering a scanning light beam emitted by a light source and/or the field of view of a light detector about three mutually orthogonal axes.

2. Description of Related Art

Laser scanner systems and components of the type exemplified by U.S. Pat. Nos. 4,251,798; 4,360,798; 4,369,361; 4,387,297; 4,593,186; 4,496,831; 4,409,470; 4,460,120; 4,607,156; 4,673,803; 4,736,095; 4,758,717; 4,816,660; 4,808,804; 4,816,661; 4,760,248; 4,871,904; 4,806,742; 4,845,350, as well as U.S. application Ser. Nos. 148,669 now U.S. Pat. No. 4,825,057, and 147,708 now U.S. Pat. No. 4,835,374 all of said patents being owned by the assignee of the instant invention and being incorporated by reference herein—have generally been designed to read indicia having parts of different light reflectivity, e.g., bar code symbols, particularly of the Universal Product Code (UPC) type, at a certain working or reading distance from a hand-held or stationary scanner.

Typically, a light source such as a laser generates a light beam which is optically modified and focused to form a beam spot of a certain size at a working distance relative to a housing and is directed by optical components, including a reflecting mirror, along a light path through an exit port of the housing toward a bar code symbol located in the vicinity of the working distance for reflection from the symbol. A photodetector having a field of view extending across and slightly past the symbol detects light of variable intensity reflected off the symbol and generates electrical signals indicative of the detected light. These electrical signals are decoded into data descriptive of the symbol. A scanning component may be situated in the housing, and is operative to either sweep the beam spot in a scan pattern across the symbol, or to scan the field of view of the photodetector, or simultaneously do both. The scanning component is typically a drive motor operatively connected to the reflecting mirror. The scanning component can also be a charge-coupled device (CCD) array.

In any case, one drawback with such known scanners is that the exit port, also known as a scanning aperture, is stationarily mounted on the housing and faces in a single direction. To change direction, one must move the housing. In some applications, this was found to be a limiting factor, especially in the case of workstations where there was limited counter space. In hand-held scanners, both right- and left-handed operators were not easily accommodated by a scanner having a fixed scanning aperture.

It is known in the art of hand-held bar code scanners, for example, in Japanese Patent No. 02-231689, to adjustably steer a laser beam in a single plane through a stationary exit port on a housing by pivoting a reflecting mirror about a single axis. However, the range was limited, and right- and left-handed operators were not readily accommodated.

It is also known in the art of scanner workstations, for example, in U.S. Pat. No. 5,105,070, to adjustably steer a laser beam in a single plane by rotating an adapter mounted on a desk-top support about a single axis. Again, the limited movement of the laser beam in a single plane did not satisfactorily expand limited counter space.

The components for the light scanning system, including the light source, optics, photodetector, scanning components and an electrical conductor, are mounted together in a common assembly to constitute a compact, lightweight, scan module. The scan module is mounted in an interchangeable, modular manner in housings of different configurations.

For example, the housing can be hand-held and shaped as a cylinder in a so-called flashlight-type configuration, or shaped as a box, or shaped with a gun-like configuration. The housing can be mounted on the back of the operator's arm (see, for example U.S. Pat. No. 4,766,299) or on one or more fingers of the operator's hand, typically with the aid of a strap, a clip, or a glove. The housing can be mounted on the operator's arm, typically adjacent or on the writ. The housing can be mounted in a countertop workstation. The housing can be mounted in a mobile cart, or shopping cart, or, in some cases, even in a stationary installation.

The compact, lightweight nature of the scan module enables myriad other housing configurations to be fashioned. Thus, the scan module can be mounted anywhere on an operator's person, e.g. in a helmet to be worn on the operator's head, in eyeglasses to be worn in front of the operator's eyes, in a shoulder or body harness, etc.

SUMMARY OF THE INVENTION

1. Objects of the invention

It is a general object of this invention to advance the state of the art of electro-optical systems for reading indicia of different light reflectivity, particularly laser scanner systems for reading bar code symbols.

Another object of this invention is to adjustably steer a scanning beam, such as a laser beam, about three mutually orthogonal axes.

Still another object of this invention is to adjustably steer a field of view of a photodetector about three mutually orthogonal axes.

Yet another object of this invention is to readily accommodate both right- and left-handed operators of hand-held bar code scanners.

A further object of this invention is to increase effective counter space in scanner workstations.

A still further object of this invention is to interchangeably mount a scan module having an adjustable scan head in housings of different configurations.

2. Features of the Invention

In keeping with these objects, and others which will become apparent hereinafter, one feature of this invention resides, briefly stated, in an electro-optical system for reading indicia having parts of different light reflectivity, e.g., bar code symbols having alternating bars and spaces.

In accordance with one feature of this invention, a movable scan head having an exit port is adjustably mounted on a scan module for freedom of movement about two mutually orthogonal axes to adjustably position the exit port relative to the scan module. Preferably, the scan head has a generally spherical or ball-shaped configuration, and the scan module has a generally spherical socket for receiving the spherical head for multiple freedoms of movement about three mutually orthogonal axes intersecting within the scan head.

The system includes a light source for emitting a light beam, and optics for directing the light beam along an outgoing path through the exit port toward the indicia to be read. A sensor, e.g. a photodiode, having a field of view, is operative for detecting at least a portion of light of variable intensity reflected along a return path off the indicia, preferably through the exit port. A scanning component is operative for scanning at least one of said light beam and said field of view over the indicia to be read.

In one preferred embodiment, wherein the light beam is steered, the optics includes a light reflector mounted in the scan head for joint movement therewith. The light source is mounted remotely from the scan head, and a first optical fiber conveys the light beam from the light source to the scan head. The photodiode is also mounted remotely from the scan head, and a second optical fiber conveys the reflected light from the scan head to the photodiode.

In another preferred embodiment, wherein the field of view is steered, the light source and the scanning component are mounted in the scan head for joint movement therewith. Preferably, the scanning component includes a charge-coupled device array and a lens for focusing the reflected light onto the array.

In accordance with another feature of this invention, the scan head is formed as a movable portion of a housing, and the scan module is formed as a stationary portion of the housing. The housing can be a hand-held scanner having any configuration, or a terminal, or a workstation.

By providing for an infinitely variable, continuous, adjustable movement about three axes, the light beam and/or the field of view can be positioned where desired, thereby effectively maximizing counter space during workstation operation, and rendering the system more versatile for right and left-handed operators during hand-held operation.

The novel features which are considered as characteristic of the invention are set forth in particular in the appended claims. The invention itself, however, both as to its construction and its method of operation, together with additional objects and advantages thereof, best will be understood from the following description of specific embodiments when read in connection with the accompanying drawings.

DETAILED DESCRIPTION OF THE PREFERRED EMBODIMENTS

The above identified patents and patent applications generally identify scanner systems, the entire contents of all of which are hereby incorporated by reference herein, for reading symbols, particularly UPC bar code symbols. As used in this specification and the following claims, the term "symbol" is intended to be broadly construed and to cover not only symbol patterns composed of alternating bars and spaces, but also other patterns, as well as alphanumeric characters and, in short, any indicia having portions of different light reflectivity.

Figure 1:
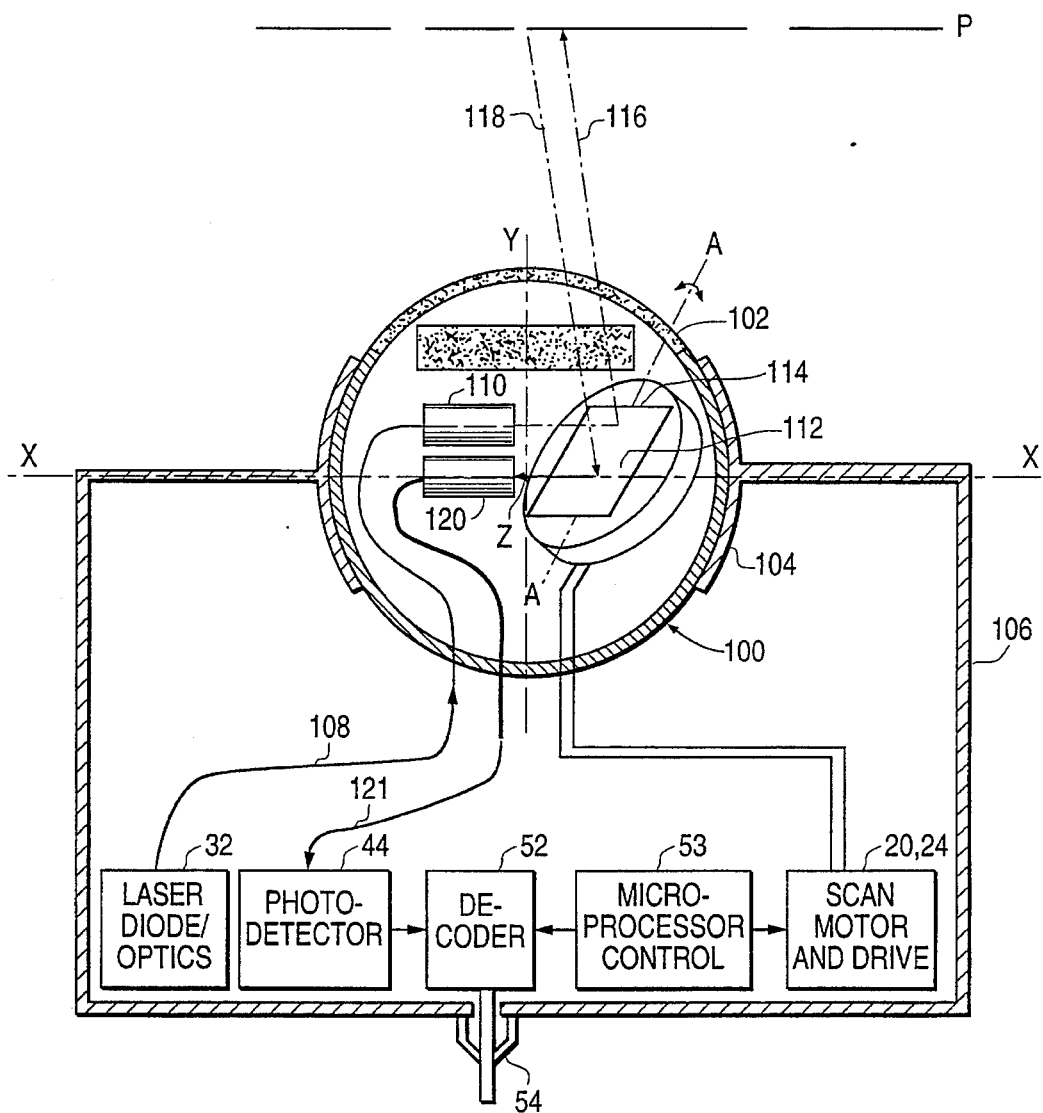
FIG. 1 is a part-sectioned, part-perspective view of a scanning system in accordance with an embodiment of this invention.

FIG. 1 shows a generally spherical or ball-shaped scan head 100 having a scanning aperture 102 or light-transmissive exit port is mounted in a socket 104 for freedom of movement about at least two, and preferably three, mutually orthogonal axes X, Y, Z intersecting within the scan head 100 at its geometric center. Axis X is horizontal; axis Y is vertical; and axis Z extends into the plane of FIG. 1.

Socket 104 is stationarily mounted on a scan module 106 which can be installed in many different types of electro-optical systems having housings of various configurations, e.g., hand-held terminals with keyboard and display capability, hand-held scanners, workstation scanners, fixed scanners, etc. The reference numeral 106 can also identify the aforementioned housing itself for those applications which do not require a single scan module to be installed in different housings.

Thus, a laser diode 32, with or without a focusing lens, is mounted in the module or housing 106, and the laser beam emitted therefrom is conveyed along a flexible, elongated, single-mode, optical fiber 108 into the head 100 to a launching end 110 adjacent a light reflector 112. The reflector 112 is mounted on a support 114 which is repetitively driven in alternate circumferential directions about an axis A over arc lengths less than 360° in each direction by a scan motor 20 and drive control circuitry 24 as described above and in greater detail in U.S. Pat. No. 4,496,831 incorporated by reference above.

The alternate oscillations of the reflector 112 direct the laser beam impinging thereon out through the exit port 102 along an outgoing path 116 toward, and in a scan pattern across, a symbol located preferably exteriorly of the head 100 at a reference plane P. A portion of the light reflected off the symbol returns along a return path 118 through the same exit port 102 onto the reflector which reflects the reflected light onto a receiving end 120 of another flexible, elongated, multi-mode optical fiber 121 which conveys the reflected light away from the head to the photodetector 44. The photodetector detects the variable intensity of the reflected light over its field of view and generates an electrical analog signal indicative of the detected variable light intensity. The analog signal is digitized and decoded in the decoder 52 and microprocessor control circuitry 53, in the patents and patent applications incorporated by reference above. The output decoded signal containing data descriptive of the symbol being read is outputted by the multi-wire, plug-in cable connector 54 to a display or a host computer, depending on the system configuration.

The ball-and-socket joint for the head 100 enables 360° adjustment of the exit port about the vertical y axis relative to the module or housing 106. The adjustment is infinitely variable, i.e., continuous, and friction enables the head to stay in any adjusted position. The outgoing laser beam traveling along path 116 and/or the reflected light returning along path 118 can thus be steered. This versatility enables both right- and left-handed operators to be accommodated and increases the range in which desk-top workstations can be used.

Figure 2:
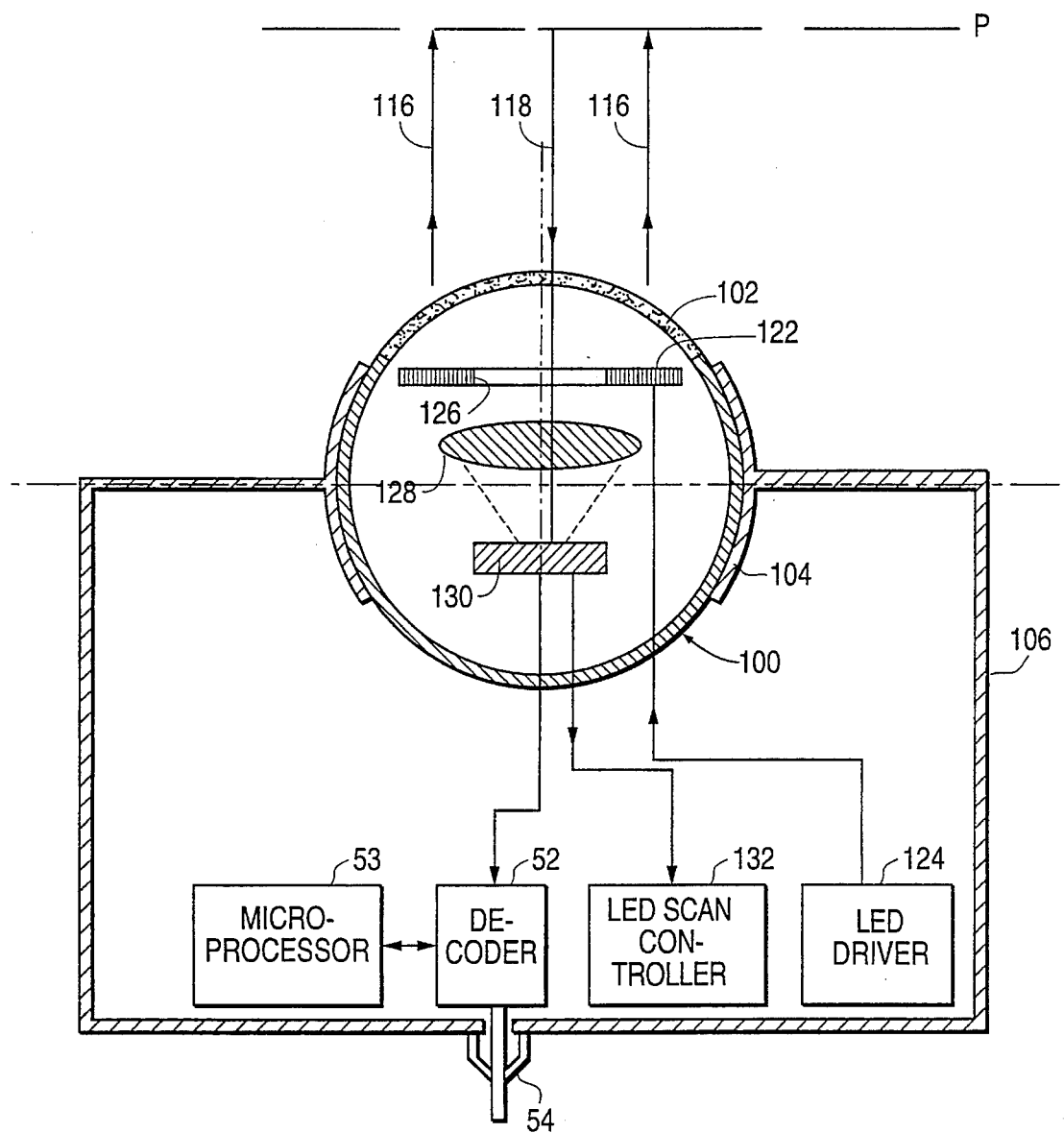
FIG. 2 is a view analogous to FIG. 1 but of still another embodiment of this invention.

Turning now to FIG. 2, like reference numerals have been used to identify like parts with those of FIG. 1. In a departure from FIG. 1, the light source is not a laser diode, but a light emitting diode (LED) illuminator 122 mounted in the scan head 110. The illuminator 122 is driven by a driver 124 mounted remotely from the head 100 in the module or housing 106. The illuminator emits light along outgoing path 116 through the exit port 102 and uniformly illuminates the entire symbol at the reference plane P.

The reflected light returning to the head along return path 118 through the exit port 102 passes through a central aperture 126 in the illuminator to a focusing lens 128 operative to focus the reflected light onto a charge-coupled device (CCD) array 130. The array 130 is electrically connected to a conventional CCD scan controller 132 remotely mounted in the module or housing 106. The controller sequentially energizes the array elements, thereby scanning the symbol over a field of view. The array 130 generates analog electrical signals indicative of the scanned symbol. These analog signals are digitized and decoded in a signal processing decoder 52, again under control of a microprocessor 53. The decoder 52 generates an output data signal from connector 54.

Hence, in the FIG. 1 embodiment, both the laser beam emitted by the laser diode 32 and the field of view of the photodectector 44 are steered to a selected position in space. In the embodiment shown in FIG. 2, the light from the illuminator 122 and the field of view of the array 130 are steered in space to any desired orientation.

In a variant construction, all of the above components, e.g., the light source, the scanning component and the sensor can all be mounted in the scan head, thereby providing for a compact, versatile system.

It will be understood that each of the elements described above, or two or more together, also may find a useful application in other types of constructions differing from the types described above.

While the invention has been illustrated and described as embodied in a bar code scanner with scanning beam and/or field of view adjustable about three mutually orthogonal axes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In an electro-optical system for reading indicia having parts of different light reflectivity, a scan module comprising:

(a) a movable scan head having an exit port;

(b) means for emitting and directing a light beam along an outgoing path through the exit port toward indicia to be read;

(c) sensor means having a field of view, and operative for detecting at least a portion of light of variable intensity reflected along a return path off the indicia;

(d) scanning means for scanning at least one of said light beam and said field of view over the indicia to be read; an (e) mean for adjustably mounting the scan head on the scan module for freedom of movement about two mutually orthogonal axes to adjustably position the exit port relative to the scan module, the mounting means including a concave arced portion of a casing of the scan module that supports a spherical surface of the scan head, wherein the directing means includes a light reflector mounted in the scan head for joint movement therewith, and wherein the emitting means includes a light source mounted remotely from the scan head, and an optical fiber for conveying the light beam from the light source to the scan head.

2. The scan module according to claim 1, wherein the sensor means includes a photodetector mounted remotely from the scan head, and another optical fiber for conveying the reflected light from the scan head to the photodetector.

3. An arrangement in alight scanning system for reading indicia having part of different light reflectivity, comprising:

(a) a housing having a stationary portion, and a movable portion formed with an exit port;

(b) means for emitting and directing a light beam along an optical path through the exit port toward indicia to be read;

(c) photodetector means having a field of view and operative for detecting at least a portion of light of variable intensity reflected along a return path through the exit port off the indicia, and for generating an electrical signal indicative of the detected light intensity;

(d) scanning means for scanning at least one of the light beam and the field of view; and (e) means for adjustably steering said at least one of the light beam and the field of view to different courses, including means for mounting the movable portion for movement relative to the stationary portion about at least two mutually orthogonal axes, the steering means including a concave arced portion of the stationary portion of the housing that supports a spherical portion of the movable portion, wherein the directing means includes a light reflector mounted in the movable portion for joint movement therewith, and wherein the emitting means includes a light source mounted remotely from the movable portion and an optical fiber for conveying the light beam from the light source to the movable portion.

4. An arrangement in a light scanning system for reading indicia having part of different light reflectivity, comprising:

(a) a housing having a stationary portion, and a movable portion formed with an exit port;

(b) means for emitting and directing a light beam along an optical path through the exit port toward indicia to be read;

(c) photodetector means having a field of view and operative for detecting at least a portion of light of variable intensity reflected along a return path through the exit port off the indicia, and for generating an electrical signal indicative the detected light intensity;

(d) scanning means for scanning at least one of the light beam and the field of view; and (e) means for adjustably steering said at least one of the light beam and the field of view to different courses, including means for mounting the movable portion for movement relative to the stationary portion about at least two mutually orthogonal axes, the steering means including a concave arced portion of the stationary portion of the housing that supports a spherical portion of the movable portion, wherein the directing means includes a light reflector mounted in the movable portion for joint movement therewith, and wherein the photodetector means includes a photodetector mounted remotely from the movable portion, and another optical fiber for conveying the reflected light from the movable portion to the photodetector.

5. In an electro-optical system for reading indicia having parts of different light reflectivity, an apparatus comprising:
(a) a substantially spherically-shaped scan head having an exit port on a portion of the head;
(b) means for emitting and directing a light beam along an outgoing path through the exit port toward indicia to be read;
(c) means having a field of view for detecting at least a portion of light of variable intensity reflected along a return path off the indicia; and
(d) means for adjustably mounting the scan head in curved portions of a casing of the apparatus to allow the scan head to move about at least one axis.

6. The apparatus according to claim 5, further comprising:
(e) scanning means for scanning said light beam over the indicia to be read.

7. The apparatus according to claim 6, wherein the scanning means is mounted in the scan head for joint movement therewith.

8. The apparatus according to claim 5, further comprising:
(e) scanning means for scanning said field of view over the indicia to be read.

9. The apparatus according to claim 8, wherein the scanning means is mounted in the scan head for joint movement therewith.

10. The apparatus according to claim 8, wherein the scanning means includes a charge-coupled device array.

11. The apparatus according to claim 10, wherein the scanning means further includes means for focusing the reflected light onto the array.

12. The apparatus according to claim 5, wherein the mounting means allows the scan head to rotate about a first axis intersecting the exit port.

13. The apparatus according to claim 5, wherein the mounting means allows the scan head to rotate about at least two mutually orthogonal axes.

14. The apparatus according to claim 5, wherein the mounting means allows the scan head to rotate about three mutually orthogonal axes.

15. The apparatus according to claim 5, wherein the mounting means includes circumferential support members surrounding the scan head to allow rotational movement of the scan head about at least one axis.

16. The apparatus according to claim 5, wherein the mounting means includes a socket for receiving the scan head to allow rotational movement of the scan head about at least one axis.

17. The apparatus according to claim 5, wherein the emitting and directing means includes a light reflector mounted in the scan head for joint movement therewith.

18. The apparatus according to claim 5, wherein the emitting and directing means includes a light source mounted in the scan head for joint movement therewith.

19. The apparatus according to claim 5, wherein the emitting and directing means includes a light source mounted remotely from the scan head.

20. The apparatus according to claim 19, wherein the emitting and directing means further includes an optical fiber for conveying the light beam from the light source to the scan head.

21. The apparatus according to claim 5, wherein the detecting means includes a photodetector mounted remotely from the scan head, and an optical fiber for conveying the reflected light from the scan head to the photodetector.

22. An arrangement in a light scanning system for reading indicia having parts of different light reflectivity, comprising:
(a) a housing having a first portion including a curved edge, and a second substantially spherically-shaped portion movable relative to the first portion and engageable with the curved edge and defining an exit port for a beam of light;
(b) means for emitting and directing a light beam along an optical path through the exit port toward indicia to be read;
(c) photodetector means having a field of view and operative for detecting at least a portion of light of variable intensity reflected along a return path passing through the exit port off the indicia, and for generating an electrical signal indicative of the detected light intensity; and
(d) means for adjustably steering said at least one of the light beam and the field of view to different courses, including means for mounting the second portion for movement relative to the first portion about at least one axis.

23. The arrangement according to claim 22, further comprising:
(e) scanning means for scanning the light beam.

24. The arrangement according to claim 23, wherein the scanning means is mounted in the second portion for joint movement therewith.

25. The arrangement according to claim 22, further comprising:
(e) scanning means for scanning the field of view.

26. The arrangement according to claim 25, wherein the scanning means is mounted in the second portion for joint movement therewith.

27. The apparatus according to claim 25, wherein the scanning means includes a charge-coupled device array.

28. The apparatus according to claim 27, wherein the scanning means further includes means for focusing the reflected light onto the array.

29. The apparatus according to claim 22, wherein the mounting means includes circumferential support members surrounding the second portion to allow rotational movement of the second portion about at least one axis.

30. The arrangement according to claim 22, wherein the mounting means includes a socket for receiving the second portion to allow rotational movement of the second portion about at least one axis.

31. The arrangement according to claim 22, wherein the emitting and directing means includes a light reflector mounted in the second portion for joint movement therewith.

32. The arrangement according to claim 22, wherein the emitting and directing means includes a light source mounted in the second portion for joint movement therewith.

33. A system for reading symbols, comprising:
(a) a hand-held scanning unit in a lightweight, portable housing including symbol-detection means for generating and directing a laser beam toward a symbol to be read, and for receiving reflected light from the symbol to produce electrical signals corresponding to data represented by the symbol; and read-control means for actuating the symbol-detection means to initiate reading of the symbol; and (b) a substantially spherically-shaped, beam-directing unit engaged with curved walls of the scanning unit for variable movement about at least one axis, including a light reflector for receiving the laser beam from the symbol-detection means and an exit port jointly movable with the beam-directing unit, thereby adjustably steering the laser beam to a particular course.

34. The system according to claim 33, wherein the beam-directing unit is mounted on the scanning unit for variable movement about at least two mutually-orthogonal axes intersecting within the beam-directing unit.

35. The system according to claim 33, wherein the beam-directing unit is mounted on the scanning unit for variable movement about three mutually-orthogonal axes intersecting within the beam-directing unit.

36. The system according to claim 33, wherein the symbol-detection means includes scanning means for repetitively scanning the laser beam over at least a portion of the symbol to be read.

37. The system according to claim 36, wherein the symbol-detection means includes photodetector means for detecting at least a portion of light of variable intensity reflected off the symbol.

38. A system for reading bar code symbols or the like, comprising:

(a) a hand-held scanning unit in a lightweight, portable housing including symbol-detection means for generating and directing light toward a symbol to be read, and for receiving reflected light from the symbol over a field of view to produce electrical signals corresponding to data represented by the symbol; and read-control means for actuating the symbol-detection means to initiate reading of the symbol; and (b) a substantially spherically-shaped, field-of-view directing unit engaged with curved walls of the scanning unit for variable movement about at least one axis, including means for collecting the reflected light, and an exit port jointly movable with the field-of-view directing unit, thereby adjustably steering the field of view to receive the reflected light along a particular course.

39. The system according to claim 38, wherein the field-of-view directing unit is mounted on the scanning unit for variable movement about at least two mutually-orthogonal axes intersecting within the field-of-view directing unit.

40. The system according to claim 38, wherein the field-of-view directing unit is mounted on the scanning unit for variable movement about three mutually-orthogonal axes intersecting within the field-of-view directing unit.

41. In a bar code reader in which a light beam is emitted from an exit port of a substantially spherically-shaped movable portion of a housing toward a bar code to be read for detecting the bar code over a field of view, the improvement which comprises means for changing the overall direction of at least one of the emitted beam and the field of view with respect to the housing by moving the substantially spherically-shaped movable portion about at least one axis, the movable portion being engaged with curved walls of the housing.

42. The bar code reader according to claim 41, wherein the movable portion is movable about at least two mutually orthogonal axes intersecting within the movable portion.

43. The bar code reader according to claim 41, wherein the movable portion is movable about three mutually orthogonal axes intersecting within the movable portion.

44. The bar code reader according to claim 41, wherein the direction changing means includes circumferential support members surrounding the movable portion to allow rotational movement of the movable portion.

45. A method of reading indicia having parts of different light reflectivity in a light scanning system including:

(a) forming a housing with a stationary portion is curved, and a substantially spherically-shaped movable portion engaged with the stationary portion having an exit port;

(b) generating and directing a light beam along an optical path through the exit port toward indicia to be read;

(c) detecting at least a portion of light of variable intensity reflected off the indicia over a field of view, and generating a signal indicative of the detected light intensity;

(d) scanning at least one of said light beam and said field of view; and (e) moving the movable portion and the exit port relative to the stationary portion about at least one axis, and positioning the exit port at a desired location on the housing by rotating the exit port within an arced concave portion of the housing.

46. The method according to claim 45, wherein the moving step is performed by moving the movable portion and the exit port about at least two mutually orthogonal axes intersecting within the movable portion.

47. The method according to claim 45, wherein the moving step is performed by moving the movable portion and the exit port about three mutually orthogonal axes intersecting within the movable portion.

48. The method according to claim 45, wherein the forming step is performed by configuring the movable portion as a generally spherical scan head, and configuring the stationary portion as a socket for receiving the scan head.

49. The method according to claim 45, wherein the positioning step includes the step of turning the movable portion through 360° about a vertical axis.

50. The method according to claim 45, wherein the method includes providing a display for displaying information on the housing, and providing a keyboard for entering information on the housing.

* * * * *

UNITED STATES PATENT AND TRADEMARK OFFICE
CERTIFICATE OF CORRECTION

PATENT NO. : 5,479,002
DATED : December 26, 1995
INVENTOR(S) : Frederic Heiman et al.

It is certified that error appears in the above-indentified patent and that said Letters Patent is hereby corrected as shown below: On the title page:

Abstract: line 2, change "ball-and, socket" to --ball-and-socket--.

Claims: Please replace claims 5, 22, 24, 26, 29-33, 38, 41 and 45.

5. In an electro-optical system for reading indicia having parts of different light reflectivity, an apparatus comprising:
    (a) a substantially spherically-shaped scan head having an exit port on a portion of the head;
    (b) means for emitting and directing a light beam along an outgoing path through the exit port toward indicia to be read;
    (c) means having a field of view for detecting at least a portion of light of variable intensity reflected along a return path off the indicia; and
    (d) means for adjustably mounting the scan head in a casing of the apparatus to allow the scan head to move about at least one axis, the mounting means including a concave arced portion of the casing that supports a spherical surface of the scan head.

22. An arrangement in a light scanning system for reading indicia having parts of different light reflectivity, comprising:
    (a) a housing having a concave arced portion, and a substantially spherically-shaped portion supported by the concave arced portion defining an exit port for a beam of light;
    (b) means for emitting and directing a light beam along an optical path through the exit port toward indicia to be read;
    (c) photodetector means having a field of view and operative for detecting at least a portion of light of variable intensity reflected along a return path passing through the exit port off the indicia, and for generating an electrical signal indicative of the detected light intensity; and

UNITED STATES PATENT AND TRADEMARK OFFICE
CERTIFICATE OF CORRECTION

PATENT NO. : 5,479,002
DATED : December 26, 1995
INVENTOR(S) : Frederic Heiman et al.

It is certified that error appears in the above-indentified patent and that said Letters Patent is hereby corrected as shown below:

(d) means for adjustably steering said at least one of the light beam and the field of view to different courses, including means for mounting the substantially spherically-shaped portion for movement relative to the concave arced portion about at least one axis.

24. The arrangement according to claim 44, wherein the scanning means is mounted in the substantially spherically-shaped portion for joint movement therewith.

26. The arrangement according to claim 46, wherein the scanning means is mounted in the substantially spherically-shaped portion for joint movement therewith.

29. The apparatus according to claim 43, wherein the mounting means includes circumferential support members surrounding the substantially spherically-shaped portion to allow rotational movement of the substantially spherically-shaped portion about at least one axis.

30. The arrangement according to claim 43, wherein the mounting means includes a socket for receiving the substantially spherically-shaped portion to allow rotational movement of the substantially spherically-shaped portion about at least one axis.

31. The arrangement according to claim 43, wherein the emitting and directing means includes a light reflector mounted in the substantially spherically-shaped portion for joint movement therewith.

UNITED STATES PATENT AND TRADEMARK OFFICE
CERTIFICATE OF CORRECTION

PATENT NO. : 5,479,002
DATED : December 26, 1995
INVENTOR(S) : Frederic Heiman et al.

It is certified that error appears in the above-indentified patent and that said Letters Patent is hereby corrected as shown below:

32. The arrangement according to claim 43, wherein the emitting and directing means includes a light source mounted in the substantially spherically-shaped portion for joint movement therewith.

33. A system for reading symbols, comprising:
   (a) a hand-held scanning unit in a lightweight, portable housing including symbol-detection means for generating and directing a laser beam toward a symbol to be read, and for receiving reflected light from the symbol to produce electrical signals corresponding to data represented by the symbol; and read-control means for actuating the symbol-detection means to initiate reading of the symbol; and
   (b) a substantially spherically-shaped, beam-directing unit supported by a concave arced portion of the scanning unit for variable movement about at least one axis, including a light reflector for receiving the laser beam from the symbol-detection means and an exit port jointly movable with the beam-directing unit, thereby adjustably steering the laser beam to a particular course.

38. A system for reading bar code symbols or the like, comprising:
   (a) a hand-held scanning unit in a lightweight, portable housing including symbol-detection means for generating and directing light toward a symbol to be read, and for receiving reflected light from the symbol over a field of view to produce electrical signals corresponding to data represented by the symbol; and read-control means for actuating the symbol-detection means to initiate reading of the symbol; and

UNITED STATES PATENT AND TRADEMARK OFFICE
CERTIFICATE OF CORRECTION

PATENT NO. : 5,479,002

DATED : December 26, 1995

INVENTOR(S) : Frederic Heiman et al.

It is certified that error appears in the above-indentified patent and that said Letters Patent is hereby corrected as shown below:

(b) a substantially spherically-shaped, field-of-view directing unit supported by a concave arced portion of the scanning unit for variable movement about at least one axis, including means for collecting the reflected light, and an exit port jointly movable with the field-of-view directing unit, thereby adjustably steering the field of view to receive the reflected light along a particular course.

41. In a bar code reader in which a light beam is emitted from an exit port of a substantially spherically-shaped movable portion of a housing toward a bar code to be read for detecting the bar code over a field of view, the improvement which comprises means for changing the overall direction of at least one of the emitted beam and the field of view with respect to the housing by moving the substantially spherically-shaped movable portion about at least one axis, the movable portion having a spherical surface supported by a concave arced portion of the housing.

45. A method of reading indicia having parts of different light reflectivity in a light scanning system including:
    (a) forming a housing having a concave arced portion, and a substantially spherically-shaped movable portion supported by the concave arced portion having an exit port;
    (b) generating and directing a light beam along an optical path through the exit port toward indicia to be read;
    (c) detecting at least a portion of light of variable intensity reflected off the indicia over a field of view, and generating a signal indicative of the detected light intensity;
    (d) scanning at least one of said light beam and said field of view; and

UNITED STATES PATENT AND TRADEMARK OFFICE
CERTIFICATE OF CORRECTION

PATENT NO. : 5,479,002

DATED : December 26, 1995

INVENTOR(S) : Frederic Heiman et al.

It is certified that error appears in the above-indentified patent and that said Letters Patent is hereby corrected as shown below:

(e) moving the movable portion and the exit port relative to the stationary portion about at least one axis, and positioning the exit port at a desired location on the housing by rotating the exit port within an arced concave portion of the housing.

Signed and Sealed this

Fifteenth Day of October, 1996

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO.: 5,479,002

DATED: December 26, 1995

INVENTOR(S): Frederic Heiman et al.

It is certified that an error appears in the above-identified patent and that said Letters Patent is hereby corrected as shown below:

Please correct the following claims:

24. The arrangement according to claim [44] 23, wherein the scanning means is mounted in the substantially spherically-shaped portion for joint movement therewith.

26. The arrangement according to claim [46] 25, wherein the scanning means is mounted in the substantially spherically-shaped portion for joint movement therewith.

29. The apparatus according to claim [43] 22, wherein the mounting means includes circumferential support members surrounding the substantially spherically-shaped portion to allow rotational movement of the substantially spherically-shaped portion about at least one axis.

UNITED STATES PATENT AND TRADEMARK OFFICE
CERTIFICATE OF CORRECTION

PATENT NO. : 5,479,002

DATED : December 26, 1995

INVENTOR(S) : Frederic Heiman et al.

It is certified that error appears in the above-identified patent and that said Letters Patent is hereby corrected as shown below:

30. The arrangement according to claim [43] 22, wherein the mounting means includes a socket for receiving the substantially spherically-shaped portion to allow rotational movement of the substantially spherically-shaped portion about at least one axis.

31. The arrangement according to claim [43] 22, wherein the emitting and directing means includes a light reflector mounted in the substantially spherically-shaped portion for joint movement therewith.

32. The arrangement according to claim [43] 22, wherein the emitting and directing means includes a light source mounted in the substantially spherically-shaped portion for joint movement therewith.

Signed and Sealed this

Twenty-fourth Day of November, 1998

Attest:

BRUCE LEHMAN

Attesting Officer

Commissioner of Patents and Trademarks